United States Patent [19]
Wollar

[11] Patent Number: 4,776,737
[45] Date of Patent: Oct. 11, 1988

[54] RE-USABLE TWO-PIECE BLIND FASTENER

[75] Inventor: Burnell Wollar, Barrington, Ill.

[73] Assignee: Phillips Plastics Corporation, Phillips, Wis.

[21] Appl. No.: 945,762

[22] Filed: Dec. 23, 1986

[51] Int. Cl.⁴ ............................................. F16B 13/04
[52] U.S. Cl. ......................................... 411/38; 411/55; 411/369; 411/908
[58] Field of Search ..................... 411/34–38, 411/41, 55, 386, 542, 369, 370; 24/297

[56] References Cited

U.S. PATENT DOCUMENTS

| | | | |
|---|---|---|---|
| 2,292,195 | 8/1942 | Brown | 411/386 |
| 2,392,133 | 1/1946 | Eklund | 411/34 |
| 2,553,236 | 5/1951 | Bratfisch | 411/34 |
| 2,918,841 | 12/1959 | Poupizch | 411/36 |
| 4,391,559 | 7/1983 | Mizusawa | 411/41 |
| 4,602,760 | 7/1986 | Tiefenbach et al. | 24/297 |
| 4,639,175 | 1/1987 | Wollar | 411/38 |
| 4,642,009 | 2/1987 | Fischer | 411/38 |
| 4,659,269 | 4/1987 | Stromiedel | 411/34 |

*Primary Examiner*—Neill Wilson
*Attorney, Agent, or Firm*—James E. Nilles; Thomas F. Kirby

[57] ABSTRACT

A re-usable two-piece fastener for releasably clamping two workpieces together comprises an expandable hollow plastic body for receiving an axially insertable and rotatable screw made of plastic or metal. The body comprises a slotted outwardly expandable shank having a head or flange at its outer end and a bore extending entirely through the body. The screw comprises a threaded shank having a head at its outer end. The body bore comprises an outer end portion of the same diameter as the threaded screw shank, an intermediate thread-engaging member having an aperture of the same diameter as the root diameter of the screw shank and sloped at the same pitch as the screw thread, and an inner end portion. The thread-engaging member may be integral with the body or may take the form of a metal insert. The inner end portion of the body bore may be of the same or larger diameter than the screw thread or may be of smaller diameter so that the screw thread can self-tap thereinto. The screw, if plastic, may have a slot at the inner end of its shank so as to provide inwardly flexible bifurcations to facilitate initial axial insertion of the inner end of the screw through the thread-engaging portion. The underside of the screw head of a plastic screw or the underside of the body flange, or both, may be provided with an integrally formed annular flexible seal and the body flange may have two such seals.

26 Claims, 7 Drawing Sheets

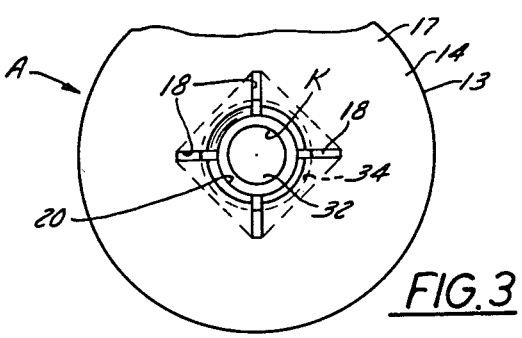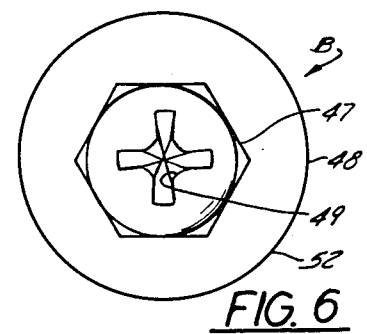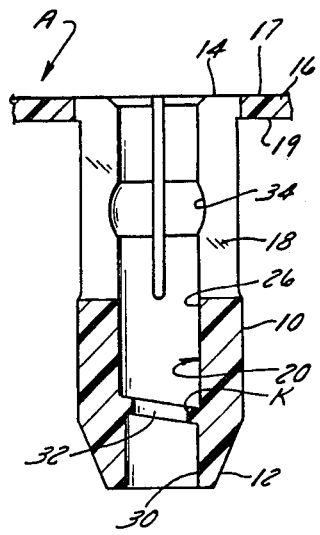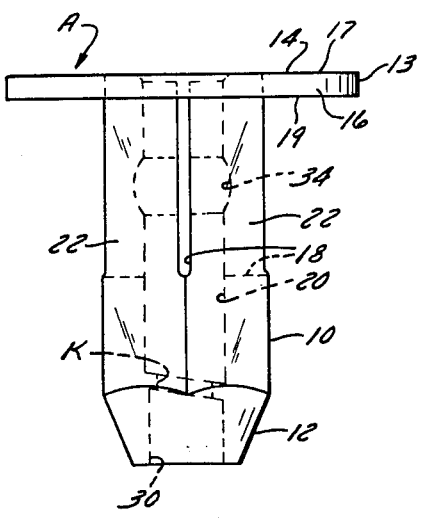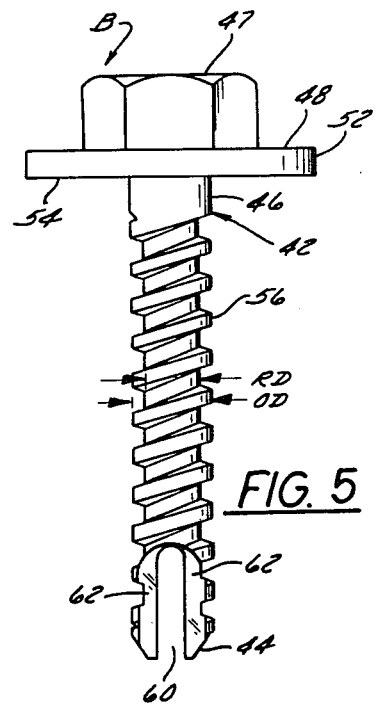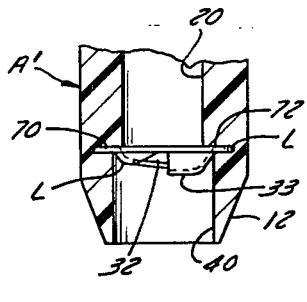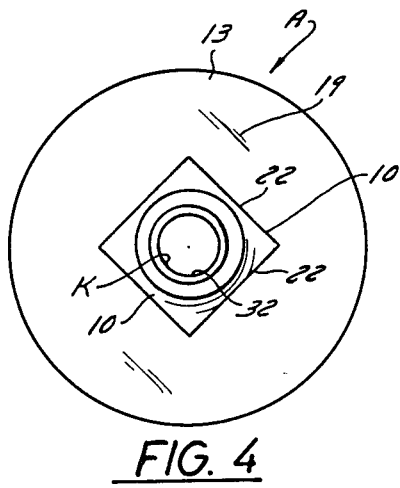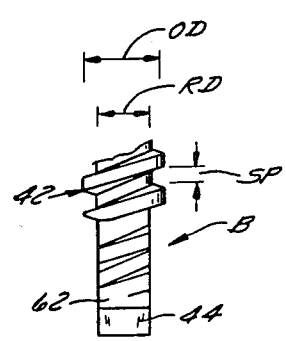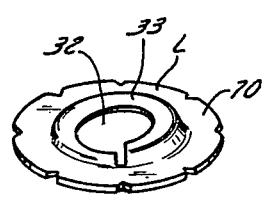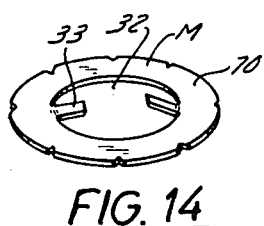

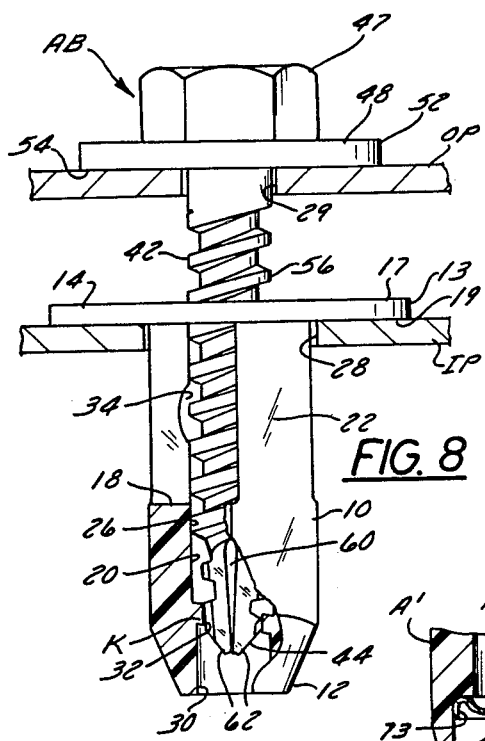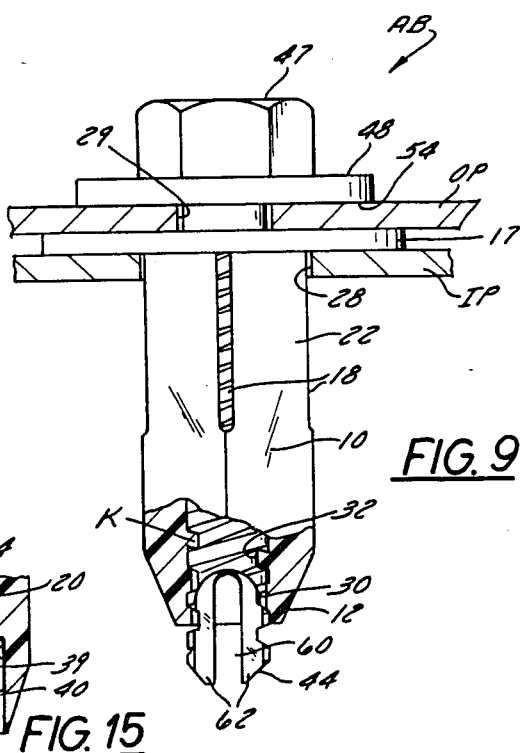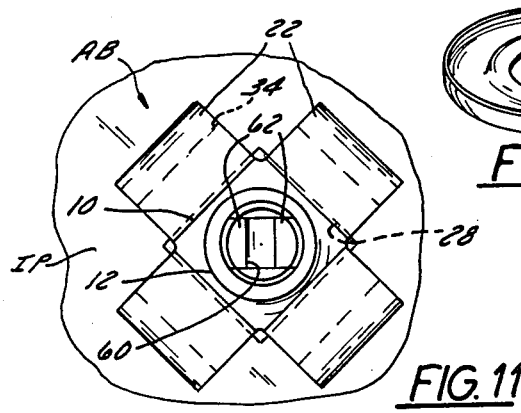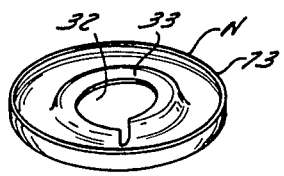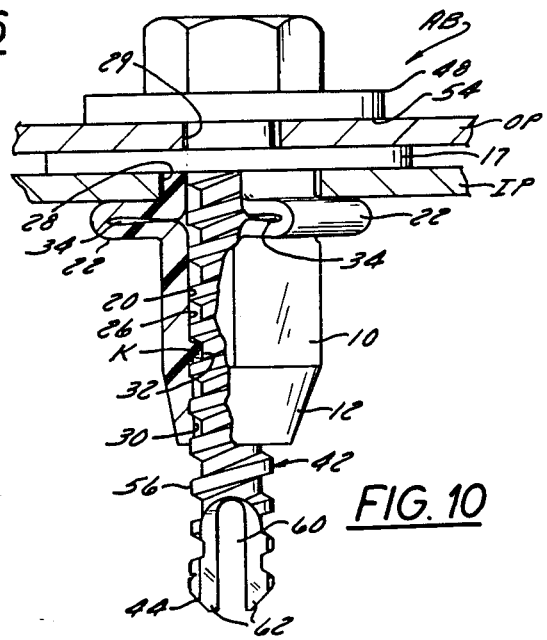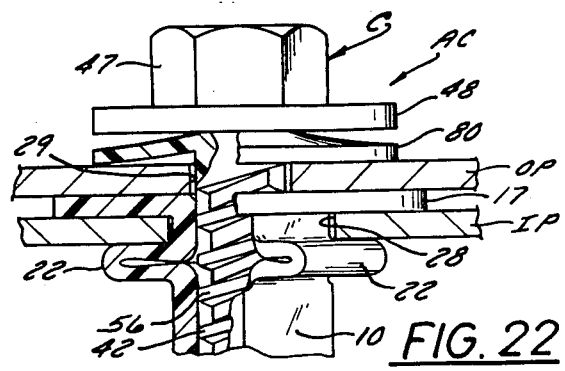

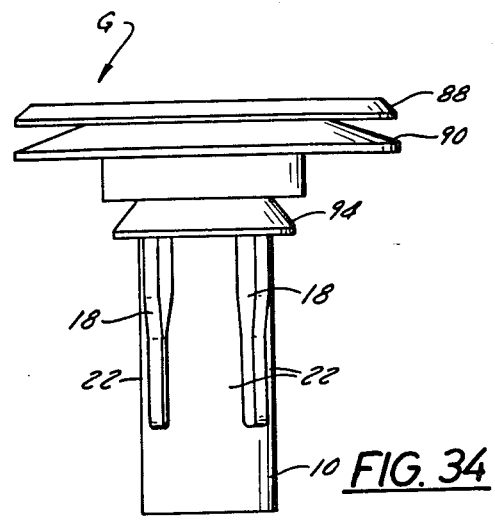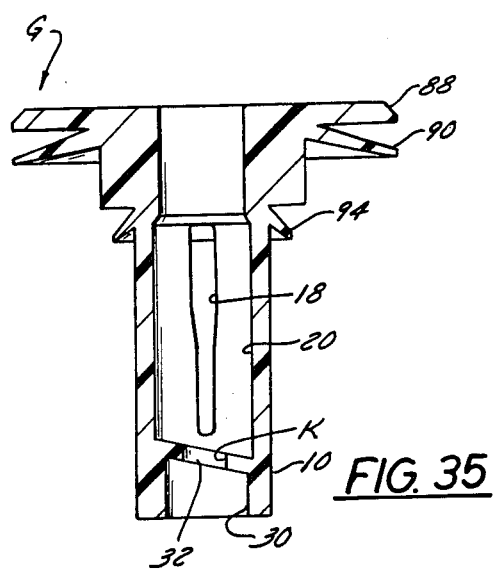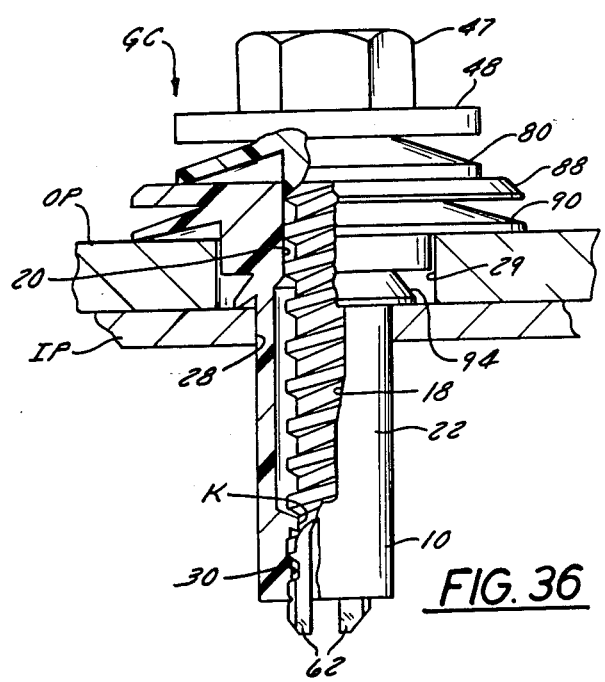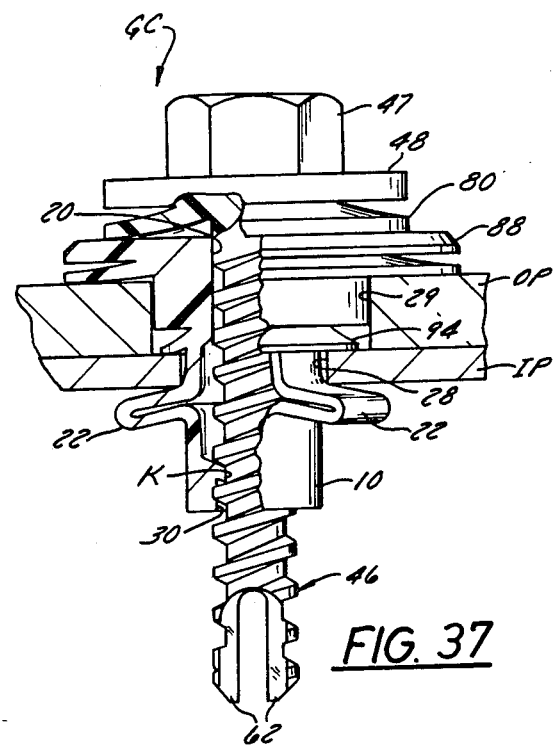

RE-USABLE TWO-PIECE BLIND FASTENER

BACKGROUND OF THE INVENTION

1. Field of Use

This invention relates generally to a re-usable two-piece blind fastener for securing panels together and comprising a hollow plastic expandable/contractable body and a screw insertable into and removable from said body. In particular, it relates to improved thread engaging means in the body and to improved sealing means on the body or on the screw or on both.

2. Description of the Prior Art

Some two-piece blind fasteners are usable to secure a plurality of panels together in face-to-face confronting relationship. Some blind fasteners are of the expansion rivet type which cannot be removed after installation in the panel holes without being destroyed. Other blind fasteners comprise a hollow expandable body and a screw. Typically, in the screw-type fasteners the body has a body head and an expandable body shank with a threaded bore and the screw has a screw head and threaded shank rotatably insertable into the body bore to effect body shank expansion. Two basic panel arrangements are possible with such a fastener. For example, in one arrangement two or more panels may be stacked together and the body shank is inserted into aligned panel holes from one side of the panel assembly. Rotatable insertion of the screw into the body bore from the same side of the panel assembly effects body expansion and the panels are entrapped between the body head and the expanded body shank. In another arrangement, the body shank may be inserted through aligned holes in a first panel assembly (one or more panels) as aforedescribed and the screw shank may be inserted through aligned holes in a second panel assembly (one or more panels) to entrap the second panel assembly between the screw head and body head.

If the body is made of metal or of certain types of plastic, it is not possible to remove the body from the panel assembly aperture, even after the screw is removed, because the body remains in permanently expanded condition. Furthermore, few prior art fasteners of this type make provision for sealing the panel apertures or the body bore when the fastener is installed. Therefore, it is desirable to provide improved reusable two-piece blind fasteners for use with panels and panel assemblies.

SUMMARY OF THE PRESENT INVENTION

A re-usable two-piece blind fastener in accordance with the invention comprises a hollow plastic expandable/contractable body and a screw. The screw is rotatably insertable into a threaded bore in the hollow body to effect body expansion and is rotatably withdrawable from the bore to enable body contraction. The body comprises a resilient expandable/contractable body shank having a body head at one end and a body bore extending through the body. The screw, which may be made of metal or plastic, comprises a threaded screw shank having a screw head at one end. Rotatable insertion of the screw shank into the bore effects expansion of the body shank. The fastener may be used to clamp a panel assembly (one or more panels) between the body head and the expanded body shank, or to clamp one panel assembly (one or more panels) between the body head and the expanded body shank and to clamp another panel assembly (one or more panels) between the body head and the screw head. The body bore comprises first and second bore portions which are located on opposite sides of screw thread engaging structure which is disposed in the bore. The first bore portion in the head end of the body is of slightly larger diameter than the screw thread and slidably receives the screw shank. The screw thread engaging structure is of slightly larger diameter than the root diameter of the screw thread and threadedly engages the screw thread to hold the screw in pre-assembled position. The diameter of the second bore portion in the insertion end of the body depends on clamp load requirements and on the materials of which the screw and the screw thread engaging structure are made. The structure may be integral with the bore wall or take the form of a metal insert entrapped in the bore. For example, if the screw is plastic, its insertion end is bifurcated and the second bore portion is of smaller diameter than the screw thread so that the latter may cut its own threads in the second bore portion as the screw is rotated. If the screw is metal, the second bore portion is of larger diameter than the screw thread. In operation, highest clamp loads are attained by using a metal screw and metal insert for the screw engaging thread, whereas successively lower clamp loads are attained by using a plastic screw and metal insert, or a metal screw and a plastic screw engaging thread, or a plastic screw and plastic screw engaging thread. The body head may be provided with one or more flexible seals to seal the panel apertures which receive the fastener body. The screw head may be provided with a flexible seal either to seal a panel aperture with which it is associated or to seal the body bore in which it is inserted.

Fasteners in accordance with the invention offer numerous advantages over the prior art. For example, the fastener is removable after installation to allow for servicing and removal of the panels and such removal does not damage the fastener (which is re-usable) and does not damage the panels. The fastener body and screw can be constructed, selected and combined in various combinations to meet various load requirements and sealing requirements. The body and screw can be easily and economically fabricated, pre-assembled prior to use, installed and removed. Other objects and advantages of the invention will hereinafter appear.

DRAWINGS

FIG. 1 is a side elevation view of a body A;
FIG. 2 is a cross-section of body A;
FIG. 3 is a head end elevation view of body A;
FIG. 4 is an insertion end elevation view of body A;
FIG. 5 is an elevation of one side of a screw B;
FIG. 6 is a head end elevation view of screw B;
FIG. 7 is an elevation view of the insertion end of another side of screw B;
FIG. 8 is a side elevation view, with portions broken away, of a fastener AB employing body A and screw B shown in initially assembled condition;
FIG. 9 is a view similar to FIG. 8, but showing fastener AB in partially assembled condition;
FIG. 10 is a view similar to FIGS. 8 and 9, but showing fastener AB in fully assembled condition;
FIG. 11 is a bottom end elevation view of fastener AB in the condition shown in FIG. 10;
FIG. 12 is a cross-section view of the lower portion of body A showing another form of thread-engaging insert therein than is shown in FIG. 2;

FIG. 13 is a perspective view of the reverse side of the insert of FIG. 12;

FIG. 14 is a perspective view of still another form of insert than is shown in FIGS. 12 and 13;

FIG. 15 is a cross-section view of the lower portion of body A showing yet another form of thread-engaging insert therein than is shown in FIGS. 11, 12 and 14;

FIG. 16 is a perspective view of the insert of FIG. 15;

FIG. 22 is a side elevation view, with portions broken away, of a fastener AC employing body A and screw C shown in fully assembled condition;

FIG. 34 is a side elevation of a body G;

FIG. 35 is a cross-section view of body G;

FIG. 36 is a side elevation view, with portions broken away, of a fastener GC employing body G and screw C shown in partially assembled condition; and FIG. 37 is a view similar to FIG. 36, but showing fastener GC in fully assembled condition.

DESCRIPTION OF PREFERRED EMBODIMENTS

First Embodiment AB

Figure 19:
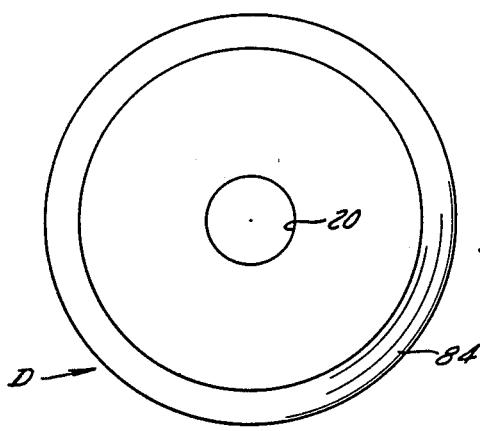
FIG. 19 is a head end elevation view of body D.
Figure 18:
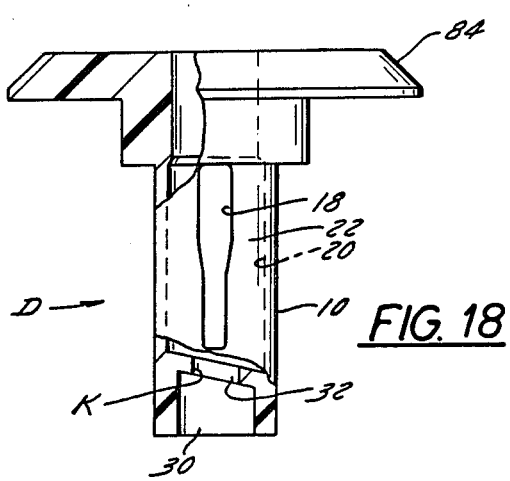
FIG. 18 is a partial cross-section view of body D.
Figure 17:
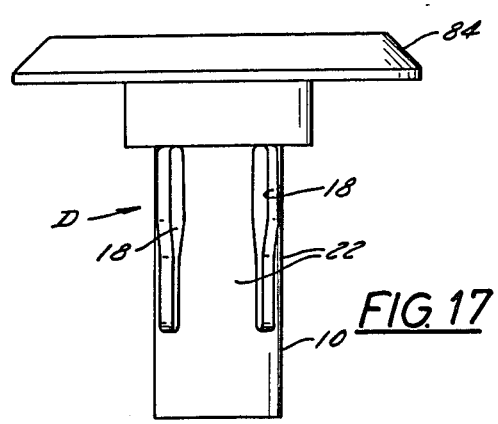
FIG. 17 is a side elevation view of a body D.
Figure 20:
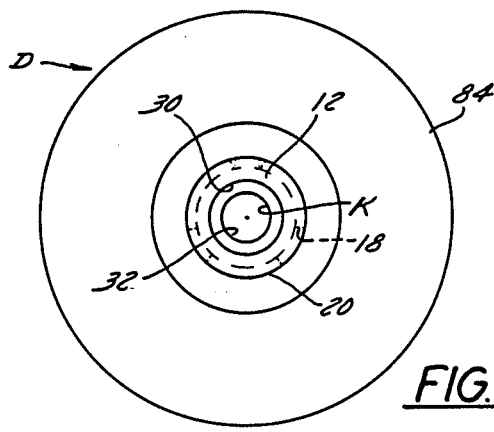
FIG. 20 is an insertion end elevation view of body D.

Referring to the drawings, FIGS. 1, 2, 3, 4, 5, 6, 7, 11, 12, 13 and 14 pertain to a first embodiment of the invention in the form of a re-usable two-piece fastener designated AB which comprises a body A and a screw B. The fastener AB is usable, for example, for releasably securing together two workpieces which take the form of panels designated as inner (or lower) panel IP and outer (or upper) panel OP. Body A is shown in detail in FIGS. 1, 2, 3 and 4. Screw B is shown in detail in FIGS. 5, 6 and 7. Fastener AB is shown in FIGS. 8, 9, 10 and 11 in various stages of assembly in connection with panels IP and OP.

Referring to FIGS. 1 through 4, body A is fabricated of relatively hard but slightly flexible and resilient plastic such as Nylon or acetal plastic material or the like by an injection molding process. Body A comprises an elongated shank 10 having an insert (lower) end 12, which is preferably tapered as shown, and a head (upper) end 14. Body A further comprises an integrally formed head or outwardly extending flange 16 at or near head end 14 and head 16 has a circular peripheral edge 13, a flat outside surface 17 and flat underside surface 19. Body A is provided with a bore 20, preferably of generally cylindrical cross-sectional configuration, which extends entirely therethrough between the ends 12 and 14 of shank 10 and is hereinafter described in detail. Shank 10 is provided with a plurality of longitudinally extending radially spaced apart slots 18 (four shown) which communicate between the exterior of shank 10 and bore 20 and define a plurality of shank wall portions 22 (four shown) which are flexibly movable between an unflexed or contracted position shown in FIG. 1 and an outwardly flexed or expanded position shown in FIG. 10. Each slot 18 is located at a corner where two wall portions 22 meet. As FIGS. 3 and 4 shown, shank 10 has a square external cross-sectional configuration which adapts it for use in a correspondingly shaped and sized hole 28 in inner panel IP (see FIGS. 8 and 11). Bore 20 comprises a first or head end portion 26 which is of the same or slightly larger diameter as the outside diameter of a screw thread 56 on a shank 42 of screw B shown in FIG. 5. Bore 20 further comprises a second or an insertion end portion 30 which is of smaller diameter than the outside diameter of thread 56 of shank 42 of screw B. Bore 20 also comprises or has disposed therein between bore portions 26 and 30 an intermediate screw thread-engaging means or member K which is integral with body A and has an aperture 32 therethrough which is of the same diameter as the root diameter RD of the thread 56 on shank 42 of screw B and is sloped at the same pitch SP (see FIG. 7). Since shank 10 of body A is of square configuration and the shank wall portions 22 are thicker in some places than in others (see FIG. 3), outer end portion 26 of bore 20 is relieved or provided with an annular indentation as at 34 to make the wall portions 22 thinner to facilitate flexing of the wall portions 22.

Screw B, best seen in FIGS. 5, 6 and 7, is fabricated of flexible, resilient plastic which could be the same as that used in body A. Screw B comprises an elongated shank 42 having an insert (lower) end 44, which is preferably tapered as shown, and a head (upper) end 46. Screw B further comprises an integrally formed head 47 having an integrally formed outwardly extending flange 48 at or near head end 46 of shank 42. Head 47 has a hexagonal cross-sectional shape so as to accommodate a wrench (not shown) and also has an indentation 49 for accommodating a screw-driver (not shown) with a tip of suitable shape. Screw flange 48 serves as an integrally formed washer and has a circular peripheral edge 52 and a flat underside surface 54. As FIG. 8 shows, the outer end 46 of screw shank 42 has a diameter which is slightly smaller than that of a hole 29 in outer panel OP through which it is to be inserted. Screw shank 42 is provided with a screw thread 56 which has, as FIG. 7 shows, an outside diameter OD, a root diameter RD, and a screw pitch SP. The insert end 44 of shank 42 of screw B is provided with a slot 60 (see FIG. 5) which extends axially inwardly of the shank and divides the shank end 44 into bifurcations or legs 62 which are flexibly movable between an unflexed position shown in FIG. 5 and an inwardly flexed position shown in FIG. 8 so as to facilitate initial insertion of shank 44 through aperture 32 in thread-engaging member K of body A (see FIG. 8).

Fastener AB as thus far described is assembled and employed as follows to secure panels OP and IP together. As FIG. 8 shows, body A is fully inserted in hole 28 in inner panel IP. Then, outer panel OP is disposed adjacent inner panel IP so that the holes 29 and 28 in panels OP and IP, respectively, are aligned. Then, screw B is axially inserted through hole 29 in outer panel OP and into bore portion 26 of bore 20 of body A. If preferred, outer panel OP with screw B already emplaced in hole 29 may be moved toward inner panel IP and body A for screw insertion, if assembly techniques so require.

As FIG. 8 shows, as screw B is further moved axially inwardly, the screw legs 62 of screw B are forcibly flexed inwardly toward each other as they pass into aperture 32 in thread-engaging means K in bore 20 of body A to assume the partially assembled position shown in FIG. 8. In this condition, screw thread 56 is operatively engaged in thread-engaging member K. At this stage, screw B is rotated by means of a wrench or screwdriver (neither shown) thereby causing the screw legs 62 to pass through aperture 32 and again expand outwardly (see FIG. 12). As rotation continues the inner end 12 of body shank 10 is drawn toward panel IP and the shank wall portions 22 to flex, fold and expand outwardly until they reach the position and condition shown in FIGS. 10 and 11. As previously explained, bore portion 30 of body A is of smaller diameter than outside diameter OD of thread 56 and thread 56 self-taps or cuts into the surface defining bore portion 30, as shown in FIGS. 9 and 10 to ensure even greater holding force between body A and screw B and greater clamping force on the panel. As FIG. 10 shows, inside panel IP is clamped between the folded wall portions 22 and the underside surface 19 of body head 16. Outside panel OP is clamped between the outside surface 17 of body head 16 and the underside surface 54 of screw flange 48. Screw B can be disengaged from body A and the panels OP and IP released from clamping engagement by pushing on the screw while rotating screw B in the direction opposite to that used during insertion to cause the wall portions 22 to contract or straighten out. Then, pulling on screw B effects removal of body A from hole 28 in inner panel IP, the folded wall portions 22 being straightened out and not interfering with removal. Fastener AB is not damaged by being disengaged or disassembled and can be re-used.

Second Embodiment A¹B

As FIGS. 12, 13, 14, 15 and 16 show, instead of using the integrally formed intermediate thread-engaging member K in body A as shown in FIG. 2 to engage screw B, a body A¹ is provided which supports in its bore 20 a metal (or other strong material) insert such as L (FIGS. 12 and 13) or M (FIG. 14) or N (FIGS. 15 and 16) is used to engage screw B or a metal screw (not shown). Since a metal insert will more firmly engage the thread 56 of screw B or a metal screw (not shown), it is unnecessary for the screw to self-tap additional threads into the walls defining the insertion end portion 30 of bore 20, as FIG. 9 shows. Instead, a wider bore portion 40 may be employed in body A¹ as shown in FIGS. 12 and 15. As FIGS. 12 and 13 make clear, insert L comprises aperture 32 and a peripheral flange or edge 70 which is received in recess means such as an annular slot 72 formed in body A¹ at the interface between the bore portions 26 and 30 of bore 20. Insert M shown in FIG. 14 also comprises an aperture 32 and a flange 70 which can engage slot 72 in body A¹. As FIGS. 15 and 16 show, insert N comprises an aperture 32 and a rolled or turned peripheral flange or edge 73 which frictionally engages the wall 39 of bore portion 40 in body A¹ and bears upwardly against a shoulder 74 formed between the bore portions 26 and 30. The inserts L, M and N have apertures 32 defined by insert portions 33 which are of the slightly larger diameter and of the same pitch as the screw B or metal screw (not shown) to be used therewith.

If preferred, the apertures 32 in the means K or in the inserts L, M and N could receive a metal screw (not shown) similar in shape to screw B and in such a case, since the insert end of the metal screw would be non-resilient and non-flexible, the slot 60 would be unnecessary.

The two-piece fasteners AB and A¹B and other alternative embodiments thereof hereinafter described are particularly well-suited for securing together two workpieces such as the panels OP and IP. It is to be understood, however, that a two-piece fastener in accordance with the invention could be secured to a single panel such as IP and the screw could be used to mount or attach some type of component other than panel OP thereto. Of, if preferred, a screw such as B could be modified (not shown) so that some utilitarian element is made integral with or connected to head 47, such as a hook, an eye, a shelf-support, or threaded stem (none shown).

Five Other Embodiments Designated AC, DC, EB, FC and GC

Figure 21:
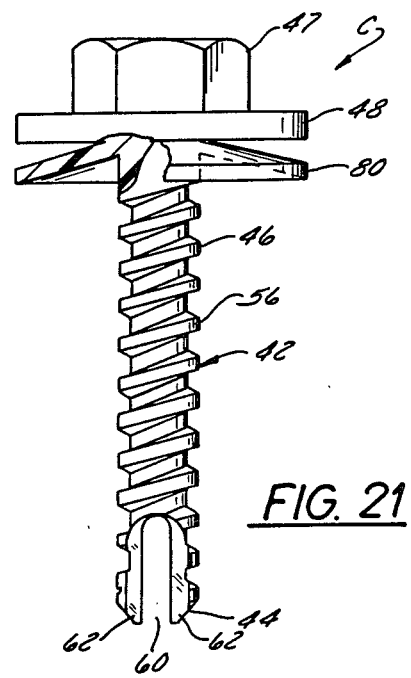
FIG. 21 is an elevation view of one side of a screw C.
Figure 23:
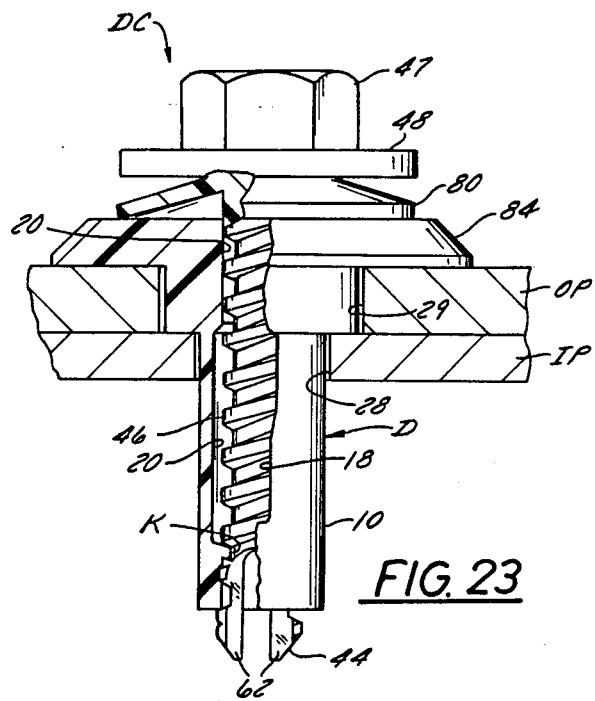
FIG. 23 is a side elevation view, with portions broken away, of a fastener DC employing body D and screw C shown in partially assembled condition.
Figure 24:
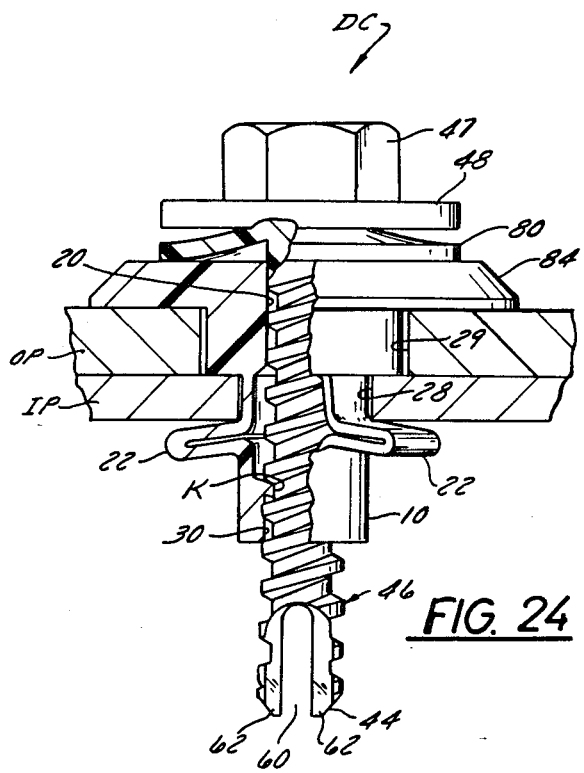
FIG. 24 is a view similar to FIG. 23, but showing fastener DC in fully assembled condition.
Figure 25:
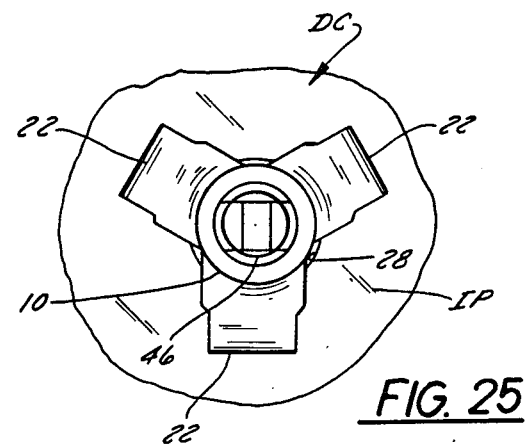
FIG. 25 is an insertion end elevation view of fastener DC in the condition shown in FIG. 24.
Figure 26:
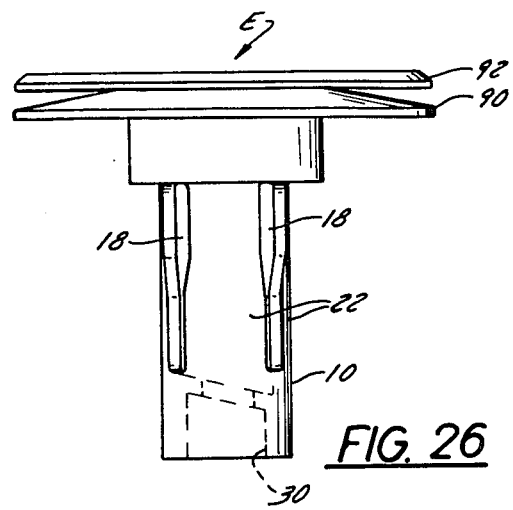
FIG. 26 is a side elevation view of a body E.
Figure 27:
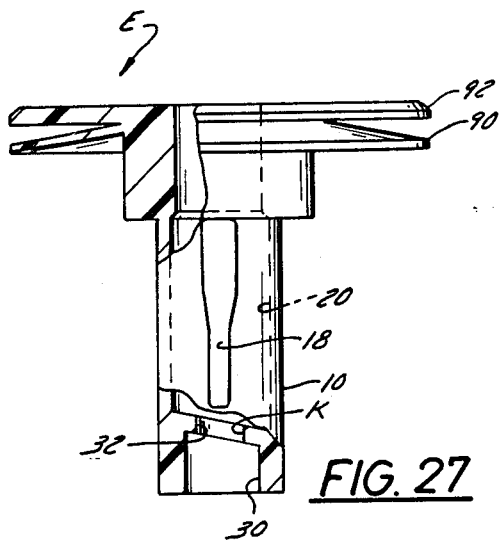
FIG. 27 is a side elevation view of a body E.

In the following description, five other fastener embodiments, designated AC, DC, EB, FC and GC, are disclosed for use with the panels OP and IP. The screw designated C in these embodiments is similar in all respects to plastic screw B hereinbefore described, except that screw C is provided with an integrally formed flexible annular sealing flange 80 (see FIGS. 21, 22, 23, 24, 32, 33, 36 and 37) which is sealingly engageable either to engage panel OP to seal the aperture 29 therein (see FIGS. 21 and 22); or to engage a head 84 on a body D (see FIGS. 23 and 24) of fastener DC to seal the head end of the body bore 20 in body F; or to engage a head 88 on a body G (see FIGS. 36 and 37) of fastener GC to seal the head end of body bore 20 in body G.

Body D (FIGS. 17, 18, 19, 20, 23, 24 and 25) is generally similar to body A hereinbefore described, but has a cylindrical cross section and only three expandable/-contractable wall portions 22.

Figure 28:
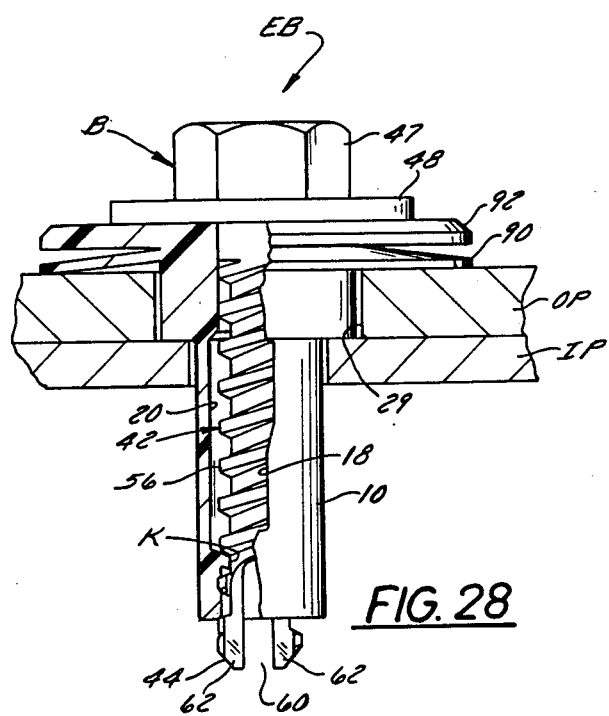
FIG. 28 is a side elevation view, with portions broken away, of a fastener EB employing body E and screw B shown in partially assembled condition.
Figure 29:
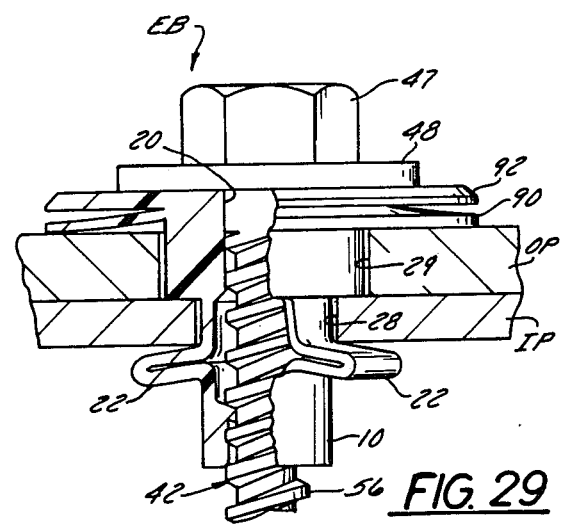
FIG. 29 is a view similar to FIG. 28, but showing fastener EB in fully assembled condition.
Figure 30:
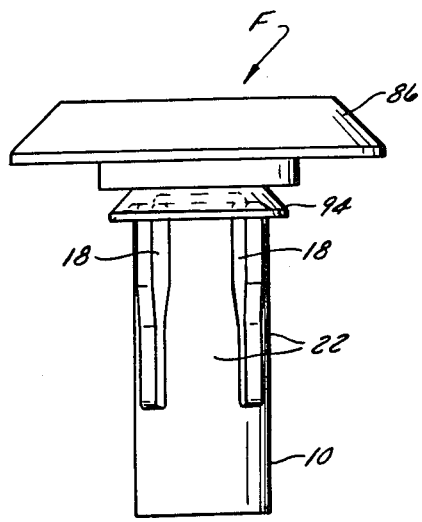
FIG. 30 is a side elevation view of a body F.
Figure 31:
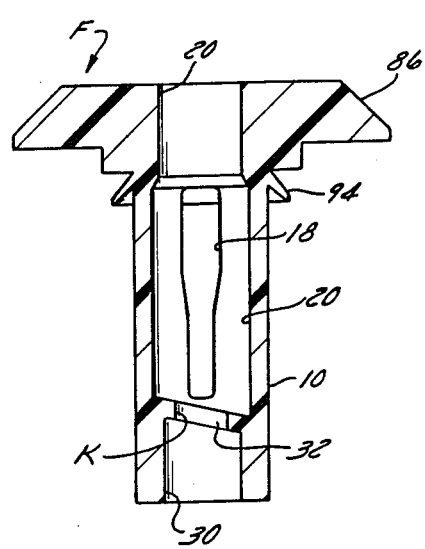
FIG. 31 is a cross-section view of body F.

Body E (FIGS. 26, 27, 28 and 29) is also generally similar to body A, but has three wall portions 22, and is provided with an integrally formed flexible annular sealing flange 90 adjacent its head 92 which is sealingly engageable with panel OP to seal the aperture 29 therein (see FIGS. 28 and 29).

Figure 32:
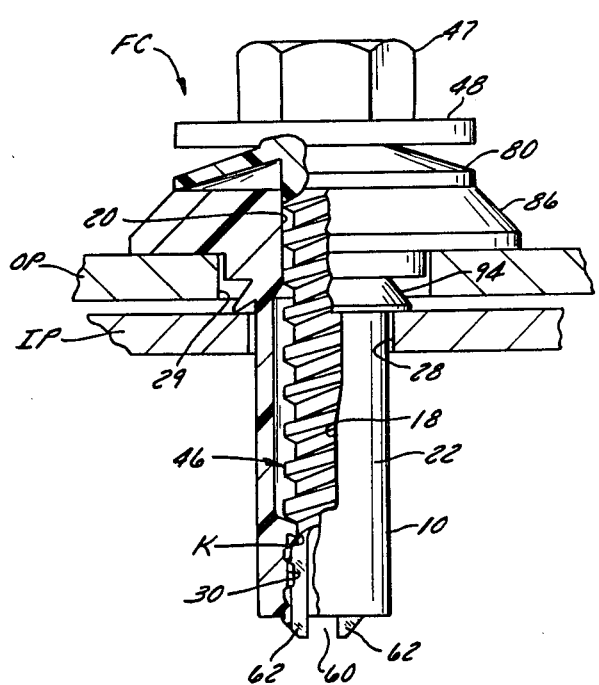
FIG. 32 is a side elevation view, with portions broken away, of a fastener FC employing body F and screw C shown in partially assembled condition.
Figure 33:
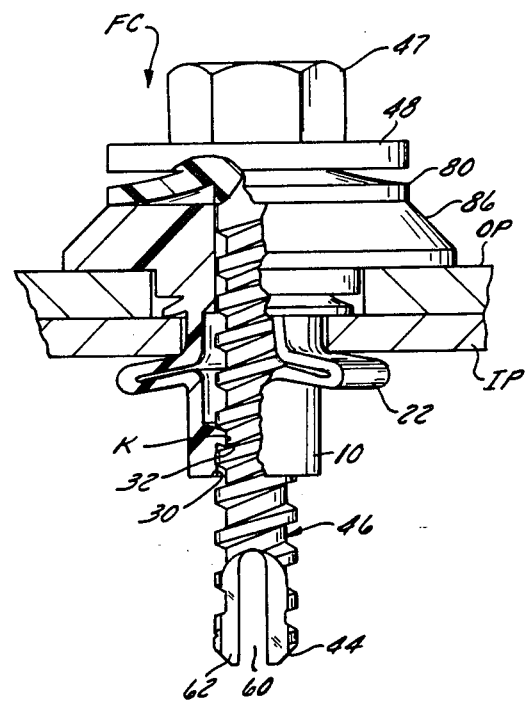
FIG. 33 is a view similar to FIG. 32, but showing fastener FC in fully assembled condition.

Body F (FIGS. 30, 31, 32 and 33) is generally similar to body E, but has a smaller diameter sealing flange 94 which is adapted to fit through aperture 29 in outer panel OP and to sealingly engage inner panel IP to seal the aperture 28 therein (see FIGS. 32 and 33).

Body G (FIGS. 34, 35, 36 and 37) is generally similar to body F in that it has a seal 94 and is also similar to body E in that it also has a seal 90.

It is to be understood that the bodies D, E, F and G may each be provided with inserts such as L, M or N, instead of a thread engaging member K.

As is apparent from the foregoing description, various combinations of bodies, screws, screw engaging means and panels other than those depicted are possible to suit various panel arrangements, sealing arrangements, and load requirements.

I claim:

1. A re-usable two-piece fastener for removable mounting in a panel hole defined by a single hole in a single panel or by a plurality of aligned holes in a plurality of panels, said fastener comprising:

a screw comprising a threaded screw shank having a predetermined outside thread diameter and a predetermined root diameter, and a screw head;

a resilient flexible plastic body comprising a body shank insertable into said panel hole, a body head and a bore extending through said body for receiving said threaded screw shank, said bore comprising first and second bore portions, screw thread engaging means on said body shank in said bore between said first and second bore portions and having an aperture therethrough;

said aperture having an inside diameter smaller than said predetermined outside thread diameter and larger than said predetermined root diameter to enable said screw thread engaging means to threadedly engage and guide said threaded screw shank into the second bore portion;

said body shank in the region surrounding the first bore portion having an unexpanded condition and an expanded condition for engagement with a surface of a panel;

said first bore portion, when said body shank is in unexpanded condition, having a diameter larger than said predetermined outside thread diameter so as to slidably accommodate insertion or withdrawal of said threaded screw shank.

2. A fastener according to claim 1 wherein said second bore portion has a diameter smaller than said predetermined outside thread diameter and larger than said predetermined root diameter to enable said threaded screw shank to cut its own threads into said body shank in the region surrounding said second bore portion as said screw is rotated to effect expansion of said body shank.

3. A fastener according to claim 1 wherein said second bore portion has a diameter larger than said predetermined outside thread diameter to prevent said threaded screw shank from cutting its own threads into said body shank in the region surrounding said second bore portion as said screw is rotated to effect expansion of said body shank, and wherein threaded engage-ment between said threaded screw shank and said screw thread engaging means as said screw is rotated effects expanded or unexpanded condition of said body shank.

4. A fastener according to claim 1 or 2 or 3 wherein said screw thread engaging means is integrally formed on said body shank.

5. A fastener according to claim 1 or 2 or 3 wherein said screw thread engaging means is a discrete member entrapped in said bore.

6. A fastener according to claim 1 or 2 or 3 wherein said insertion end of said screw shank of said screw is formed of resilient flexible plastic and has slot means extending axially inwardly to define a plurality of flexible legs which flex radially inwardly as they enter said aperture to facilitate such entry.

7. A fastener according to claim 1 or 2 or 3 wherein a wall portion of said body shank in the region surrounding said first bore portion is of reduced thickness to thereby facilitate flexing of said wall portion between expanded and unexpanded condition.

8. A fastener according to claim 1 or 2 or 3 wherein said screw further comprises integrally formed flexible annular sealing means disposed adjacent said screw head and operable to seal whichever of said panel hole and said bore is adjacent thereto when said fastener is fully installed.

9. A fastener according to claim 1 or 2 or 3 wherein said body further comprises integrally formed flexible annular sealing means disposed adjacent said body head and operable to seal said panel hole.

10. A fastener according to claim 1 or 2 or 3 wherein said screw further comprises integrally formed flexible annular sealing means disposed adjacent said screw head and operable to seal whichever of a panel hole and said bore is adjacent thereto when said fastener is fully installed and wherein said body further comprises integrally formed flexible annular sealing means disposed adjacent said body head and operable to seal a panel hole when said fastener is fully installed.

11. In combination:

at least one panel having a panel hole therethrough; and a fastener for mounting on said panel comprising a body made of resilient flexible plastic and a screw;

said body having a body head, an expandable body shank, a body bore therethrough having an outer bore portion and an inner bore portion, and screw thread engagement means in said body bore between the bore portions and having an aperture therethrough;

said screw having a screw head and a screw shank with a screw thread thereon;

said outer bore portion having a diameter larger than that of said screw thread and said aperture having a diameter less than that of said screw thread;

said body shank being disposed in said panel hole and said screw shank being disposed in said body bore and threadedly engaged with said screw thread engagement means to effect expansion of said body shank and thereby entrap said panel between said body head and the expanded body shank, said screw further comprising a flexible annular sealing flange adjacent said screw head operating to seal said bore in said body, said body further comprising a flexible annular sealing flange adjacent said body head operating to seal said hole in said panel.

12. A combination according to claim 11 including a plurality of panels, each having a panel hole therethrough and disposed in confronting relationship and entrapped between said body head and said expanded body shank.

13. A combination according to claim 11 wherein said screw has an insertion end which comprises resilient flexible material and which is provided with spaced apart flexible legs which can move toward one another as said insertion end enters said aperture in said screw thread engagement means to facilitate engagement of said screw thread with said screw thread engagement means.

14. A combination according to claim 11 or 13 wherein said screw thread engagement means is integral with said body; wherein said inner bore portion has a diameter smaller than the outside diameter of said screw thread whereby the latter cuts threads in the wall of said inner bore portion as said screw shank is rotatably and axially moved therethrough.

15. A combination according to claim 11 or 13 wherein said inner bore portion has a diameter greater than the outside diameter of said screw thread whereby the latter engages only said thread engaging means in threaded relationship.

16. A combination according to claim 15 wherein said thread engaging means takes the form of a rigid insert mounted in said body bore between said inner bore portion and said outer bore portion, said aperture being formed in said insert.

17. A combination according to claim 16 wherein said insert has a peripheral edge which engages recess means in the wall of said body bore.

18. A combination according to claim 16 wherein said insert has a peripheral edge which frictionally engages the wall of said body bore and bears against shoulder means formed on said wall.

19. In combination:
inner and outer panels, each of said panels having a panel hole therethrough; and a fastener comprising a body and a screw for securing said panels together;
said body having a body head, an expandable body shank, a body bore therethrough having an outer bore portion and an inner bore portion, and screw thread engagement means in said body bore between the bore portions and having an aperture therethrough;
said screw having a screw head and a screw shank with a screw thread thereon;
said outer bore portion having a diameter larger than that of said screw thread and said aperture having a diameter less than that of said screw thread;
said body shank being disposed in the panel hole of said inner panel and engaged said screw shank being disposed in said body bore and threadly with said screw thread engagement means to effect expansion of said body shank and thereby entrap said inner panel between said body head and the expanded body shank and to entrap said outer panel between said screw head and said body head,
said screw comprising a flexible annular sealing flange adjacent said screw head operating to seal said hole in said outer panel,
said body further comprising a flexible annular sealing flange adjacent said body head operating to seal said hole in said inner panel.

20. A re-usable two-piece fastener for removable mounting in a panel hole defined by a single hole in a single panel or by a plurality of aligned holes in a plurality of panels, said fastener comprising:
a screw comprising a threaded screw shank having a predetermined outside thread diameter and a predetermined root diameter, and a screw head;
a resilient flexible plastic body comprising a body shank insertable into said panel hole, a body head and a bore extending through said body for receiving said threaded screw shank,
said bore comprising first and second bore portions, screw thread engaging means on said body shank in said bore between said first and second bore portions and having an aperture therethrough;
said aperature having an inside diameter smaller than said predetermined outside thread diameter and larger than said predetermined root diameter to enable said screw thread engaging means to threadedly engage and guide said threaded screw shank into the second bore portion;
said body shank in the region surrounding the first bore portion having an unexpanded condition and an expanded condition for engagement with a surface of a panel;
said screw further comprising integrally formed flexible annular sealing means disposed adjacent said screw head and operable to seal whichever of a panel hole and said bore is adjacent thereto when said fastener is fully installed, and said body further comprising integrally formed flexible annular sealing means disposed adjacent said body head and operable to seal a panel hole when said fastener is fully installed.

21. A fastener according to claim 20 wherein said second bore portion has a diameter smaller than said predetermined outside thread diameter and larger than said predetermined root diameter to enable said threaded screw shank to cut its own threads into said body shank in the region surrounding said second bore portion as said screw is rotated to effect expansion of said body shank.

22. A fastener according to claim 20 wherein said second bore portion has a diameter larger than said predetermined outside thread diameter to prevent said threaded screw shank from cutting its own threads into said body shank in the region surrounding said second bore portion as said screw is rotated to effect expansion of said body shank, and wherein threaded engage-ment between said threaded screw shank and said screw thread engaging means as said screw is rotated effects expanded or unexpanded condition of said body shank.

23. A fastener according to claim 20 or 21 or 22 wherein said screw thread engaging means is integrally formed on said body shank.

24. A fastener according to claim 20 or 21 or 22 wherein said screw thread engaging means is a discrete member entrapped in said bore.

25. A fastener according to claim 20 or 21 or 22 wherein said insertion end of said screw shank of said screw is formed of resilient flexible plastic and has slot means extending axially inwardly to define a plurality of flexible legs which flex radially inwardly as the enter said aperture to facilitate such entry.

26. A fastener according to claim 20 or 21 or 22 wherein a wall portion of said body shank in the region surrounding said first bore portion is of reduced thickness to thereby facilitate flexing of said wall portion between expanded and unexpanded condition.

* * * * *